United States Patent Office 3,410,833
Patented Nov. 12, 1968

3,410,833
ANIONIC POLYMERIZATION OF LACTAMS WITH OXALYL CHLORIDE-AMIDE REACTION PRODUCT AS COCATALYST
Siegfried Schaaf and Wolfgang Griehl, Chur, Grisons, Switzerland, assignors to Inventa A.G. für Forschung und Patentverwertung, Zurich, Switzerland
No Drawing. Filed May 4, 1965, Ser. No. 453,190
Claims priority, application Switzerland, May 6, 1964, 5,958/64
4 Claims. (Cl. 260—78)

ABSTRACT OF THE DISCLOSURE

A process for the polymerization of lactams to nylon-type polyamides using, beside the customary alkaline catalysts, a co-catalyst which is a reaction product of oxalyl chloride with a lactam or a copolyamide of nylon-type. The process yields polyamides having very high molecular weights, are branched and highly resistant to mechanical, thermal and chemical stresses.

The invention relates to the polymerization of higher lactams and, more particularly to a polymerization process using novel co-catalysts in addition to the usual catalysts, whereby novel plastics of unusual properties are obtained.

The polymerization of anhydrous lactams having 7 or more ring members by heating to 220–280° C. is known, with the addition of alkaline catalysts, such as, for example, alkali metal, alkali lactam, alkali hydride, Grignard compounds, lithium aluminum hydride and alkali alkyl or aryl. It is likewise known that, by further addition of linear or cyclic N-substituted diacyl amines, isocyanates, N′,N′-disubstituted urea derivatives, acid chlorides, acid anhydrides, acylated aminoacid esters, organic carbonates, N-carboxylamides, $CO_2$ or CO, this polymerization can be accelerated and also can be carried out at temperatures below the melting point of the polymer (see, for example, U.S. Patent 3,018,273).

Surprisingly, it has now been found that polyamides with particularly interesting properties are obtained when anhydrous lactams having more than 6 ring members, such as, for instance, caprolactam, enantholactam, caprylolactam and laurolactam, are polymerized in the presence of the known alkaline catalysts with the aid of very definite co-catalysts, thus, for example, at 140–200° C. yielding casts or molded bodies and a 200–300° C. a rubber-like, highly viscous polyamide melt. Suitable co-catalysts according to the present invention are the reaction products of linear or cyclic amides or polyamides with oxalyl chloride, 1 mol of oxalyl chloride being reacted per amide group. The following are named as representative examples of such co-catalysts: N-phenyl-2-methylene-oxazolidine-4,5-dione (prepared from acetanilide and oxalyl chloride), N-methyl-2-benzylidene-oxazolidine-4,5-dione (prepared from N-methyl phenyl acetamide and oxalyl chloride).

Particularly suitable are the reaction products of lactams with oxalyl chloride and of copolyamides with oxalyl chloride (always in a molar ratio of 1:1). These reaction products, for example, can be prepared in an inert solvent while splitting off HCl; they are readily soluble at 150° C. in the lactam to be polymerized.

As lactams, for example, butyrolactam, valerolactam, caprolactam and enantholactam may be employed. The copolyamides can be prepared, for instance, from some of the following constituents: Caprolactam, hexamethylene diamine adipate, hexamethylene diamine sebacate, omega-aminoundecanoic acid, laurolactam and caprylolactam.

The following may be mentioned as examples of such copolyamides: Nylon 6/66, nylon 6/6 10, nylon 6/66/610 and nylon 6/66/12.

The concentration of the co-catalyst used is 0.02–4% by weight, preferably 0.1–1% by weight (calculated on the quantity of lactam used). The alkaline catalyst is employed in the customary concentrations. The addition of the co-catalyst to the lactam preferably is effected after the addition of the alkaline catalyst to the lactam. Light and heat stabilizers, delustering agents, inert fillers, inert plasticizers, very finely divided metals, glass fibers, antioxidants and pigments may be added to the polymerization mixture. The polymerization itself is carried out under exclusion of moisture and atmospheric oxygen. It is complete after 5–30 minutes.

The polyamides obtained are of particularly high molecular weight and are branched. They are very high-grade plastics, since they are substantially insoluble in the conventional polyamide solvents, such as, for example, m-cresol, and are particularly resistant to mechanical, thermal and chemical stresses. Casts or molded pieces produced at 140–160° C., for example, do not show any shrinkage cavities or piping, nor cracks, even at a diameter of up to 25 cm., and are free from stress. They are consistently of finely crystalline structure and have a monomer content of only 0.3–3%. Their water absorption is relatively low.

The polyamides obtained by the process according to the invention show a substantially lesser shrinkage in the polymerization mold than is usually the case owing to their branching or cross-linking. They can therefore be fabricated into undistorted parts, such as gears, profiled parts, tubes or pipes.

The process according to the invention can be carried out continuously or discontinuously; continuously, for example, in a vertically arranged screw conveyor at 185–320° C.

Accordingly, the object of the present invention is a process for the polymerization of higher anhydrous lactams having 7–13 ring members at temperatures ranging from 120 to 330° C. in the presence of alkaline catalysts, whereby the reaction products of linear or cyclic amides, of polyamides or of copolyamides with oxalyl chloride, are employed as co-catalysts, about 1 mol of oxalyl chloride being reacted per mol amide group.

The invention now will be further illustrated by the following examples. However, it should be understood that these are given merely by way of explanation, and not of limitation, and that numerous changes may be made in the details without departing from the spirit and the scope of the invention as hereinafter claimed.

EXAMPLE 1

(a) 200 g. caprolactam were reacted at 110–120° C. under nitrogen with 3.5 g. of a 32% ethereal ethyl magnesium bromide solution. 0.9 g. of the co-catalyst prepared in accordance with the directions given below were added at a polymerization temperature of 170° C., which dissolved immediately. After 6 minutes, the first cloudiness appeared and after another 7 minutes the polymerization mixture solidified. The extract content after a polymerization time of 2 hours was 0.5%. 250 mg. of the extracted polymer remained undissolved in 50 g. m-cresol at 60° C. even after 4 days.

A test body milled from the polymer block had a lower water absorption capacity than normal polycaprolactam and showed in the dry state (0.2% $H_2O$) a notch impact strength of 7.5 kg. cm./sq. cm. and an ultimate bending stress of 1200 kg./sq. cm. In conditioned state, the notch impact strength is 5.4 kg. cm./sq. cm. and the ultimate bending stress is 400 kg./sq. cm.

(b) The co-catalyst employed was prepared as follows: 126.9 g. oxalyl chloride (1 mol) were dissolved in 300 g. absolute benzene. A solution of 107 g. carprolactam (0.95 mol) was slowly added dropwise at 60° C. under exclusion of moisture. Intense evolution of hydrogen chloride occurred. After the addition of the lactam, the reaction mixture acquired a red-brown coloration and, after one hour at 60° C., was refluxed for another 2 hours until the hydrogen chloride formed had been removed almost quantitatively. The benzene solvent was distilled off and a red-brown oil remained which, after standing for a prolonged period of time, solidified into a crystalline mass. It was possible to recrystallize this from xylene in the form of yellow crystals. However, it is simpler to add the co-catalyst to the polymerization mixture in liquid state.

EXAMPLE 2

3.05 g. of the oxazolidinedione derivative given below were added to a reaction mixture consisting of 1,000 g. caprolactam and 16.85 g. of a 32% ethereal solution of ethyl magnesium bromide, and the mixture was heated for 2 hours at 160° under exclusion of moisture and atmospheric oxygen. The first cloudiness occurred after 7 minutes. After 8 more minutes the polymer had become solid. The extract content was 0.8%. A sample of the polymer had not dissolved in m-cresol after 4 days, even when stirring at 60° C.

The co-catalyst was prepared by reacting a copolyamide (obtained from 400 g. caprolactam and 500 g. hexamethylene diamine adipate) with oxalyl chloride in the molar ratio of 1:1 with almost quantitative splitting off of hydrogen chloride.

EXAMPLE 3

90 g. caprolactam, 0.1 g. sodium and 0.5 g. of the reaction product obtained from oxalyl chloride and ternary copolyamide (prepared from 2 mols caprolactam, 1 mol hexamethylene diamine adipate and 1 mol hexamethylene diamine sebacate) were polymerized as described in Example 2. The polyamide obtained was insoluble in m-cresol.

EXAMPLE 4

(a) A reaction mixture consisting of 10,000 g. caprolactam, 100 g. of a 40% ethereal solution of ethyl magnesium bromide and 40 g. of N-phenyl-2-methylene-oxazolidine-4,5-dione was placed at 150° C. in an annular aluminum mold preheated to 150° C., under exclusion of atmospheric oxygen and moisture. After half an hour the product was removed from the mold. The annular molded polyamide body had a uniform structure and was completely free from stress. After cooling to room temperature, almost no more than the normal shrinkage due to thermal expansion had occurred. The polyamide obtained was not readily soluble in m-cresol.

(b) Instead of using 40 g. N-phenyl-2-methylene-oxazolidine-4,5-dione, the polymerization was carried out with 40 g. N-methyl-2-benzylidene-oxazolidine-4,5-dione. A polyamide with the properties enumerated above was obtained.

EXAMPLE 5

370 g. caprolactam were polymerized by the method described in Example 1. The polyamide obtained was insoluble in m-cresol.

We claim as our invention:

1. In a process for the polymerization of anhydrous lactams having 7 to 13 ring members of temperatures of 120 to 330° C. under exclusion of moisture and atmospheric oxygen in the presence of an alkaline catalyst, the improvement which comprises carrying out the polymerization in the presence of substantially 0.02 to 4 weight percent of a co-catalyst consisting of a reaction product of oxalyl chloride with a lactam at a temperature of at least 60° C., one mol of said chloride being reacted with substantially one mol amido group of said lactam.

2. In a process for the polymerization of anhydrous lactams having 7 to 13 ring members at temperatures of 120 to 330° C. under exclusion of moisture and atmospheric oxygen in the presence of an alkaline catalyst, the improvement which comprises obtaining high-molecular polyamides resistant to mechanical and thermal stresses, low in residual monomer content and water absorption characteristics, substantially insoluble in polyamide solvents, and of finely crystalline structure, by carrying out said polymerization in the presence of substantially 0.02 to 4 weight percent of a co-catalyst consisting of a reaction product of oxalyl chloride with a lactam at a temperature of at least 60° C., one mol of said chloride being reacted with substantially one mol amido group of said lactam.

3. A process for the polymerization of anhydrous lactams having 7 to 13 ring members, which comprises heating said lactams at 120 to 330° C. under exclusion of atmospheric oxygen and moisture in the presence of substantially 0.02 to 3.5 weight percent alkali as catalyst and of 0.02 to 4 weight percent of a co-catalyst consisting of a reaction product of oxalyl chloride with a lactam at a temperature of at least 60° C., one mol of said chloride being reacted with one mol amido group of said lactam.

4. The process as defined in claim 1, wherein said polymerization is completed within 5 to 30 minutes.

References Cited

UNITED STATES PATENTS

| | | | |
|---|---|---|---|
| 3,138,574 | 6/1964 | Kohan | 260—78 |
| 3,206,418 | 9/1965 | Giberson | 260—78 |
| 3,216,977 | 11/1965 | Brouns | 260—78 |
| 3,320,355 | 5/1967 | Hedrick et al. | 260—78 |

WILLIAM H. SHORT, *Primary Examiner.*

H. D. ANDERSON, *Assistant Examiner.*